United States Patent
Han et al.

(10) Patent No.: US 11,967,996 B2
(45) Date of Patent: Apr. 23, 2024

(54) FREQUENCY DOMAIN EQUALIZATION METHOD, EQUALIZER, OPTICAL RECEIVER, AND SYSTEM

(71) Applicant: HUAWEI TECHNOLOGIES CO., LTD., Guangdong (CN)

(72) Inventors: Jilong Han, Wuhan (CN); Liangchuan Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 17/843,335

(22) Filed: Jun. 17, 2022

(65) Prior Publication Data

US 2022/0321232 A1    Oct. 6, 2022

Related U.S. Application Data

(63) Continuation of application No. PCT/CN2020/134114, filed on Dec. 5, 2020.

(30) Foreign Application Priority Data

Dec. 20, 2019   (CN) .......................... 201911324461.3

(51) Int. Cl.
*H04B 10/69* (2013.01)
*H04L 25/03* (2006.01)

(52) U.S. Cl.
CPC ... *H04B 10/6971* (2013.01); *H04L 25/03159* (2013.01)

(58) Field of Classification Search
CPC ...................... H04B 10/6971; H04L 25/03159
(Continued)

(56) References Cited

U.S. PATENT DOCUMENTS 7,769,305 B1 *  8/2010  Roberts ................. H04L 7/0075
                                                         398/208
7,894,728 B1 *  2/2011  Sun ....................... H04L 7/0004
                                                         398/208
(Continued)

FOREIGN PATENT DOCUMENTS

CN      101409694 A     4/2009
CN      101854316 A     10/2010
(Continued)

OTHER PUBLICATIONS

Office Action issued in Chinese Application No. 201911324461.3 dated Nov. 25, 2021, 11 pages (with English translation).
(Continued)

*Primary Examiner* — Dalzid E Singh
(74) *Attorney, Agent, or Firm* — Fish & Richardson P.C.

(57) ABSTRACT

Embodiments of the present disclosure provide example frequency domain equalization methods, example equalizers, example optical receivers, and example systems. One example method includes obtaining, by an optical receiver, a first complex signal. The first complex signal is a first time domain signal. The first complex signal is obtained based on two channels of mutually independent digital electrical signals. The optical receiver converts the first complex signal into a frequency domain signal, and multiplies the first complex signal in frequency domain by a tap coefficient to obtain a second complex signal. The tap coefficient is used to implement signal compensation for the first complex signal in frequency domain. The optical receiver converts the second complex signal into a second time domain signal, divides the second time domain signal into two channels of real signals, and outputs the two channels of the real signals.

15 Claims, 6 Drawing Sheets (58) Field of Classification Search
USPC ......................................................... 398/115
See application file for complete search history.

(56) References Cited

U.S. PATENT DOCUMENTS

| | | | | |
|---|---|---|---|---|
| 2006/0031276 A1* | 2/2006 | Kumamoto | ........... | G06F 17/156 |
| | | | | 708/403 |
| 2009/0148164 A1* | 6/2009 | Roberts | ............. | H04B 10/2572 |
| | | | | 398/65 |
| 2010/0119241 A1* | 5/2010 | Yang | .................. | H04B 10/6971 |
| | | | | 398/208 |
| 2010/0209115 A1* | 8/2010 | Elahmadi | ......... | H04B 10/25137 |
| | | | | 398/147 |
| 2012/0106982 A1* | 5/2012 | Wagner | .................. | H04B 10/61 |
| | | | | 398/208 |
| 2013/0183034 A1 | 7/2013 | Zhang et al. | | |
| 2014/0099116 A1 | 4/2014 | Bai et al. | | |

FOREIGN PATENT DOCUMENTS

| | | |
|---|---|---|
| CN | 102511135 A | 6/2012 |
| CN | 104660390 A | 5/2015 |
| CN | 105393487 A | 3/2016 |
| JP | 2018152744 A | 9/2018 |
| WO | 2016103631 A1 | 6/2016 |

OTHER PUBLICATIONS

PCT International Search Report and Written Opinion issued in International Application No. PCT/CN2020/134114 dated Feb. 25, 2021, 18 pages (with English translation).
Spinnler et al., "Equalizer Design and Complexity for Digital Coherent Receivers," IEEE Journal of Selected Topics in Quantum Electronics, vol. 16, No. 5, Feb. 2010, 13 pages.
Extended European Search Report in European Appln No. 20901364.8, dated Nov. 28, 2022, 8 pages.
Kudo et al., "Coherent Optical Single Carrier Transmission Using Overlap Frequency Domain Equalization for Long-Haul Optical Systems," Journal of Lightwave Technology, vol. 27, No. 16, Aug. 15, 2009, p. 3721-3728.
Office Action in Japanese Appln. No. 2022-537807, dated Jul. 18, 2023, 8 pages (with English translation).

* cited by examiner

FREQUENCY DOMAIN EQUALIZATION METHOD, EQUALIZER, OPTICAL RECEIVER, AND SYSTEM

CROSS-REFERENCE TO RELATED APPLICATIONS

This application is a continuation of International Application No. PCT/CN2020/134114, filed on Dec. 5, 2020, which claims priority to Chinese Patent Application No. 201911324461.3, filed on Dec. 20, 2019. The disclosures of the aforementioned applications are hereby incorporated by reference in their entireties.

TECHNICAL FIELD

This application relates to the communication field, and in particular, to a frequency domain equalization method, an equalizer, an optical receiver, and a system.

BACKGROUND

In an optical communication system, a signal transmission rate increases with a bandwidth of a component. When the signal transmission rate increases to a degree, and the bandwidth of the component is less than a signal Nyquist bandwidth, the bandwidth is limited, and inter-symbol interference (ISI) is introduced to cause signal quality deterioration. Therefore, the ISI caused because the bandwidth is limited may be compensated through digital signal processing (DSP). For example, a digital equalizer is used to remove the ISI caused because the bandwidth is limited, to recover an original signal.

Figure 1:
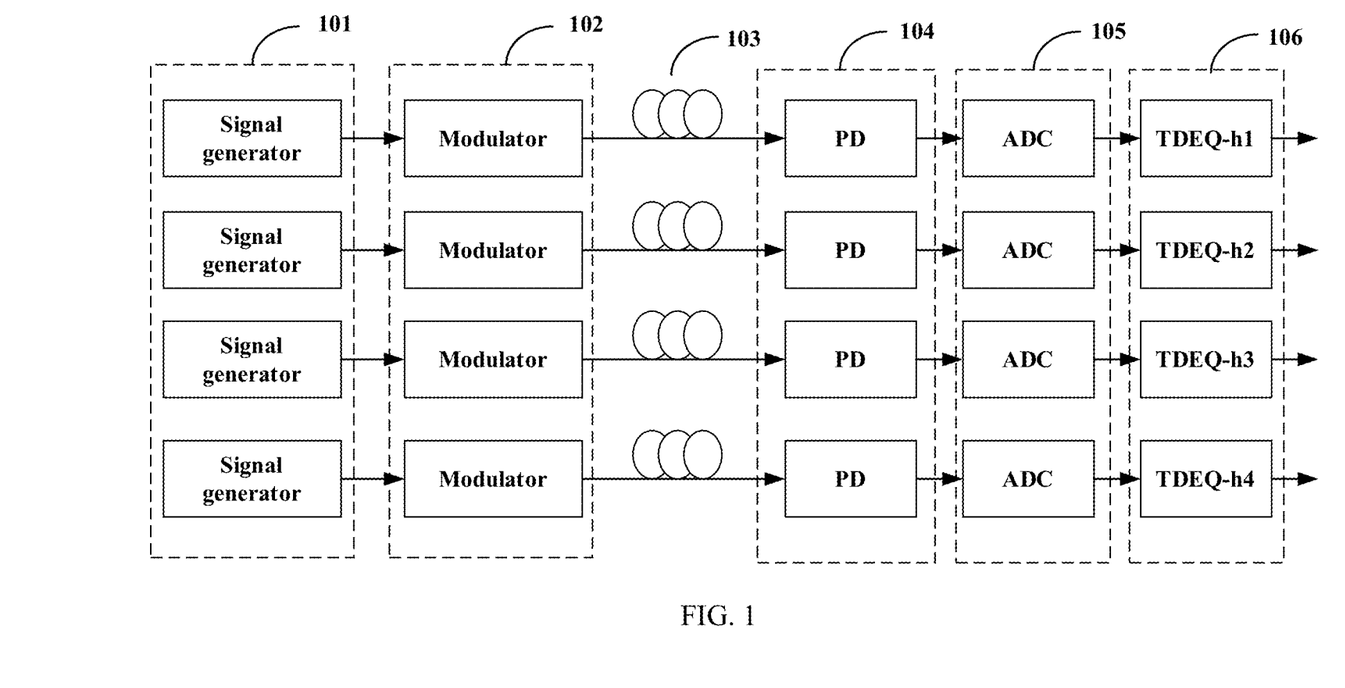
FIG. 1 is a diagram of architecture of an IMDD system implementing time domain equalization according to the conventional technologies.

To improve a transmission capacity, a communication system may perform signal transmission by using a plurality of channels. For example, for a 400G optical communication system, a multi-channel transmission manner such as 8×50G or 4×100G may be used. Currently, a 400G intensity-modulation direct-detection (IMDD) system is commercially available. The system separately transmits four channels of independent signals by using four independent channels. In a DSP of a receiver, four independent time domain equalizers (TDEQ) are added to implement equalization, to reduce an impact degree caused due to the ISI. FIG. 1 is a diagram of architecture of an IMDD system implementing time domain equalization according to the conventional technologies. As shown in FIG. 1, for a plurality of channels (for example, four channels) of transmitted signals, each channel of a signal passes through a signal generator 101, a modulator 102, fiber transmission fiber 103, a photoelectric detector (PD) 104, an analog-to-digital converter (ADC) 105, and a TDEQ 106. Each channel of a signal uses its own TDEQ. The TDEQs of the channels of the signals are independent of each other. The TDEQ outputs an equalized signal. An operation process of the TDEQ is a time domain convolution operation. Power consumption and occupied resources in the operation process are mainly determined by a quantity of taps (Tap) in the convolution operation. In addition, the quantity of taps is related to a bandwidth limitation degree. In other words, a severe bandwidth limitation degree indicates a greater quantity of taps required for the TDEQ. In this case, higher power consumption is required, and more resources are required. To control the costs and a volume, the IMDD system has strict restrictions on power consumption and resources. Therefore, the quantity of taps cannot be excessively large. However, for a next-generation 800G system or a system with a higher rate, the bandwidth of the component is severely limited, and the TDEQ needs a relatively large quantity of taps to reduce the ISI to an acceptable degree. If four TDEQs are used to implement a convolution operation of a large quantity of taps, each channel of a signal is equalized by one TDEQ, which requires high power consumption and a large quantity of resources in total. Therefore, it is difficult to meet the requirement of the IMDD system. Therefore, when equalization processing is performed on a signal, how to reduce the power consumption and the occupied resources caused due to the quantity of taps becomes a technical problem that needs to be urgently resolved.

SUMMARY

In view of this, this application provides a frequency domain equalization method, an equalizer, an optical receiver, and a system, to resolve a problem of high power consumption and excessive occupied resources caused due to an excessively large quantity of taps in time domain equalization.

According to a first aspect, this application provides a frequency domain equalization method. The method may include: An optical receiver obtains a first complex signal. The first complex signal is a time domain signal. The first complex signal may be obtained based on two channels of mutually independent digital electrical signals. The optical receiver converts the first complex signal into a frequency domain signal in a manner such as Fourier transform, and multiplies the first complex signal in frequency domain by a tap coefficient to obtain a second complex signal. The tap coefficient is used to implement signal compensation or correction for the first complex signal in frequency domain, for example, ISI compensation. The optical receiver converts the second complex signal into a time domain signal in a manner such as inverse Fourier transform, divides the second complex signal in time domain into two channels of real signals, and outputs the two channels of the real signals.

In this embodiment of the present invention, any two channels of digital electrical signals are combined into one channel of a complex signal to implement frequency domain equalization processing, to reduce power consumption and occupied resources caused due to an excessively large quantity of taps in a TDEQ and reduce system complexity.

In a possible implementation, the first complex signal includes a real part and an imaginary part, the real part comes from one of the two channels of the mutually independent digital electrical signals, and the imaginary part comes from the other one of the two channels of the mutually independent digital electrical signals.

In this embodiment of the present invention, two channels of digital electrical signals are combined into one channel of a complex signal to implement equalization processing, to reduce a quantity of frequency domain equalizers in a system and reduce system complexity.

In a possible implementation, the method further includes: receiving at least two channels of digital electrical signals, and randomly selecting the two channels of the mutually independent digital electrical signals from the at least two channels of the digital electrical signals. The two channels of the mutually independent digital signals may be understood as follows: Optical signals used to carry the two channels of the digital signals have a random polarization state or a random phase.

In a possible implementation, the method further includes: obtaining an error value based on the second complex signal in time domain or the two channels of the real signals, where the error value is used to adjust the tap coefficient. For example, the error value may be periodically obtained, or the error value may be obtained when quality of the two channels of the output real signals deteriorates.

In a possible implementation, the method includes: adjusting the tap coefficient based on the error value and the first complex signal in frequency domain.

In this embodiment of the present invention, a better frequency domain equalization effect can be obtained through dynamic adjustment of the tap coefficient, to effectively compensate for signal quality deterioration caused due to ISI.

In a possible implementation, any two channels of mutually independent digital electrical signals are obtained from two channels of optical signals having a random polarization state or a random phase.

For example, at a transmit end, any two channels of mutually independent digital electrical signals are modulated by using the optical signals having the random polarization state or the random phase. Alternatively, at a receive end, any two channels of mutually independent digital electrical signals are obtained through demodulating the optical signals having the random polarization state or the random phase. Because the digital electrical signals are independent of each other, the tap coefficient used for frequency domain equalization is relatively simple, so that calculation complexity is low.

In a possible implementation, the optical receiver obtains a channel of a first digital electrical signal, converts the first digital signal into a frequency domain signal in a manner such as Fourier transform, and multiplies the first digital signal in frequency domain by a tap coefficient to obtain a second digital signal. The tap coefficient is used to implement signal compensation or correction for the first digital signal in frequency domain, for example, ISI compensation. The optical receiver converts the second digital signal into a time domain signal in a manner such as inverse Fourier transform.

In this embodiment of the present invention, frequency domain equalization is performed on a single channel of a digital electrical signal. This may be adapted to a scenario of odd-numbered channels of transmitted signals, to improve system flexibility.

According to a second aspect, this application provides an equalizer. The equalizer may include: a time-to-frequency conversion module, configured to: obtain a first complex signal, and convert the first complex signal into a frequency domain signal in a manner such as Fourier transform, where the first complex signal may be a time domain signal obtained based on two channels of mutually independent digital electrical signals; a multiplier, configured to multiply the first complex signal in frequency domain by a tap coefficient to obtain a second complex signal, where the tap coefficient is used to implement signal compensation or correction for the first complex signal in frequency domain, for example, ISI compensation; and a frequency-to-time module, configured to: convert the second complex signal into a time domain signal in a manner such as inverse Fourier transform, divide the second complex signal in time domain into two channels of real signals, and output the two channels of the real signals.

In this embodiment of the present invention, any two channels of digital electrical signals are combined into one channel of a complex signal to implement frequency domain equalization processing, to reduce power consumption and occupied resources caused due to an excessively large quantity of taps in a TDEQ and reduce system complexity.

In a possible implementation, the first complex signal includes a real part and an imaginary part, the real part comes from one of the two channels of the mutually independent digital electrical signals, and the imaginary part comes from the other one of the two channels of the mutually independent digital electrical signals.

In this embodiment of the present invention, two channels of digital electrical signals are combined into one channel of a complex signal to implement equalization processing, to reduce a quantity of frequency domain equalizers in a system and reduce system complexity.

In a possible implementation, the equalizer is further configured to: receive at least two channels of digital electrical signals, and randomly select the two channels of the mutually independent digital electrical signals from the at least two channels of the digital electrical signals. The two channels of the mutually independent digital signals may be understood as follows: Optical signals used to carry the two channels of the digital signals have a random polarization state or a random phase.

In a possible implementation, the equalizer further includes an error calculation module, configured to obtain an error value based on the second complex signal in time domain or the two channels of the real signals, where the error value is used to adjust the tap coefficient. For example, the error value may be periodically obtained, or the error value may be obtained when quality of the two channels of the output real signals deteriorates.

In a possible implementation, the multiplier is configured to adjust the tap coefficient based on the error value and the first complex signal in frequency domain.

In this embodiment of the present invention, a better frequency domain equalization effect can be obtained through dynamic adjustment of the tap coefficient, to effectively compensate for signal quality deterioration caused due to ISI.

In a possible implementation, any two channels of mutually independent digital electrical signals are obtained from two channels of optical signals having a random polarization state or a random phase.

For example, at a transmit end, any two channels of mutually independent digital electrical signals are modulated by using the optical signals having the random polarization state or the random phase. Alternatively, at a receive end, any two channels of mutually independent digital electrical signals are obtained through demodulating the optical signals having the random polarization state or the random phase. Because the digital electrical signals are independent of each other, the tap coefficient used for frequency domain equalization is relatively simple, so that calculation complexity is low.

In a possible implementation, the time-to-frequency conversion module is configured to: obtain a channel of a first digital electrical signal, and convert the first digital signal into a frequency domain signal in a manner such as Fourier transform. The multiplier is configured to multiply the first digital signal in frequency domain by a tap coefficient to obtain a second digital signal. The tap coefficient is used to implement signal compensation or correction for the first digital signal in frequency domain, for example, ISI compensation. The frequency-to-time conversion module is configured to convert the second digital signal into a time domain signal in a manner such as inverse Fourier transform.

In this embodiment of the present invention, frequency domain equalization may be performed on a single channel of a digital electrical signal, to improve system flexibility.

According to a third aspect, this application provides an optical communication system. The optical communication system includes an optical transmitter and the optical receiver in the second aspect or any one of the possible implementations of the second aspect.

Still another aspect of this application provides a readable storage medium. The readable storage medium stores instructions. When the instructions are run on an optical transceiver, the optical transceiver is enabled to perform the methods in the foregoing aspects.

Still another aspect of this application provides a program product including instructions. When the program product runs on an optical transceiver, the optical transceiver is enabled to perform the methods in the foregoing aspects.

BRIEF DESCRIPTION OF DRAWINGS

To describe technical solutions in embodiments of the present invention, the following briefly describes the accompanying drawings used to describe embodiments.

DESCRIPTION OF EMBODIMENTS

The present invention is further described below in detail with reference to the accompanying drawings and embodiments.

Figure 2:
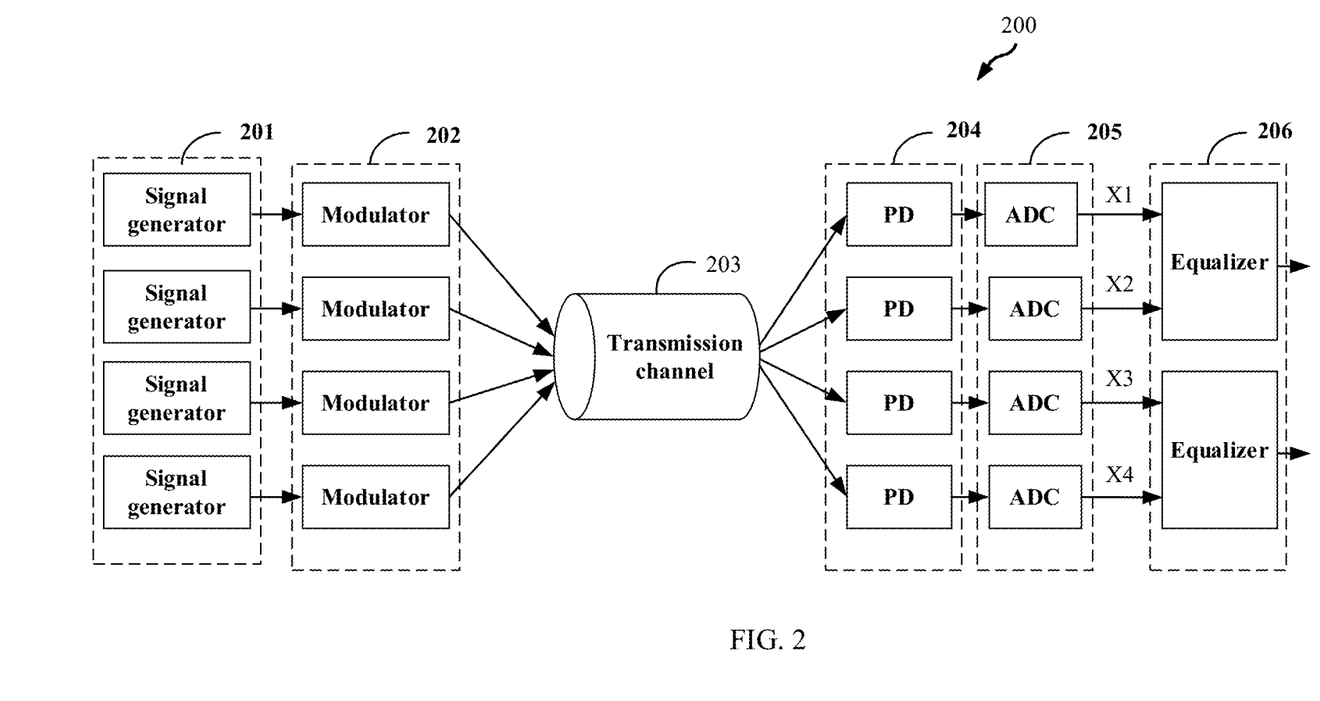
FIG. 2 is a schematic architectural diagram of an optical transmission system according to an embodiment of the present invention.

FIG. 2 is a schematic architectural diagram of an optical transmission system 200 according to an embodiment of the present invention. As shown in FIG. 2, the optical transmission system 200 may include a signal generator 201, a modulator 202, and a transmission channel 203 at a transmit end; and a photoelectric detector (PD) 204, an analog-to-digital converter (ADC) 205, and an equalizer 206 at a receive end. The optical transmission system 200 may be a unidirectional transmission system, or may be a bidirectional transmission system. FIG. 2 is described by using a unidirectional transmission system as an example.

At the transmit end, the signal generator 201 is configured to generate to-be-sent data. The to-be-sent data may be in one or more channels. For example, the to-be-sent data may be four channels of electrical signals. The four channels of the electrical signals may be generated by using four independent signal generators. The signal generator 201 may locally generate a to-be-sent electrical signal. Alternatively, the signal generator 201 may receive an electrical signal from the outside, and generate a to-be-sent electrical signal based on the received electrical signal. For the electrical signal received from the outside, pulse shaping may be performed on the electrical signal to generate the to-be-sent electrical signal. The modulator 202 may modulate the to-be-sent data to an optical carrier in a manner such as intensity modulation. For example, four modulators may be used to separately modulate four channels of electrical signals to optical carriers. In other words, each channel of an optical carrier carries one channel of an electrical signal.

The transmission channel 203 may include one or more optical fibers used to transmit an optical signal. The transmit end sends the modulated optical carrier through the optical transmission channel 203. The four channels of the optical carriers may be transmitted through different optical fibers or different wavelengths of the same optical fiber.

At the receive end, the PD 204 may be a photodiode or a phototransistor. The PD 204 is configured to convert the received optical signal into an electrical signal. The electrical signal herein may be an analog electrical signal. For example, four PDs may be used to receive the four channels of the optical carriers sent by the transmit end. The ADC 205 is configured to convert the analog electrical signal into a digital electrical signal, for example, obtain four channels of digital electrical signals. The equalizer 206 combines two channels of digital electrical signals into one channel of a complex signal, performs frequency domain equalization processing on the combined complex signal, and outputs the equalized signal. The equalizer 206 may include at least one frequency domain equalizer (FDEQ). As shown in FIG. 2, the two equalizers may be FDEQs. A function of each FDEQ may include: obtaining a channel of a complex signal based on two channels of mutually independent digital signals, where the complex signal is a time domain signal. The two channels of the mutually independent digital electrical signals may be understood as follows: Optical signals used to carry the two channels of the digital electrical signals have a random polarization state or a random phase. Time-to-frequency conversion is performed on the obtained complex signal in time domain. The complex signal in frequency domain is multiplied by a tap coefficient. The tap coefficient is used to implement signal compensation for the complex signal in frequency domain, for example, compensation for ISI of a signal. Frequency-to-time conversion is performed on the complex signal obtained after multiplication with the tap coefficient. The complex signal in time domain is divided into two channels of real signals. In this embodiment of the present invention, two FDEQs are used to replace the four TDEQs in FIG. 1, to reduce power consumption and occupied resources caused due to an excessively large quantity of taps in a TDEQ and reduce system complexity.

This embodiment of the present invention may be applied to an incoherent optical communication system (the IMDD system shown in FIG. 2), or may be applied to a coherent optical communication system. In the incoherent optical communication system, digital electrical signals: X1, X2, X3, X4 input by the ADC 205 to the equalizer 206 may be four channels of mutually independent (mutually irrelevant) sequences. Herein, mutually independence (mutually irrelevance) indicates that X1, X2, X3, and X4 at the transmit end are modulated by using four channels of optical signals having a random polarization state or a random phase. Alternatively, X1, X2, X3, and X4 at the receive end are obtained through demodulating four channels of optical signals having a random polarization state or a random phase. In the coherent optical communication system, digital electrical signals: XI, XQ, YI, and YQ input by the ADC 205 to the equalizer 206 may be modulated at the transmit end by using four channels of optical signals having a specific polarization state and a specific phase relationship, and may be obtained at the receive end through demodulating four channels of optical signals having a specific polarization state and a specific phase relationship. Herein, X and Y represent two mutually orthogonal polarization states, I represents an in-phase signal, and Q represents an orthogonal signal. A phase difference between the in-phase signal and the orthogonal signal is 90 degrees. In addition to the optical communication system, this embodiment of the present invention may be further applied to an electrical communication system, a wireless communication system, and the like. When this embodiment is applied to an electrical communication system or a wireless communication system, some optical components such as a PD may be omitted.

Figure 3:
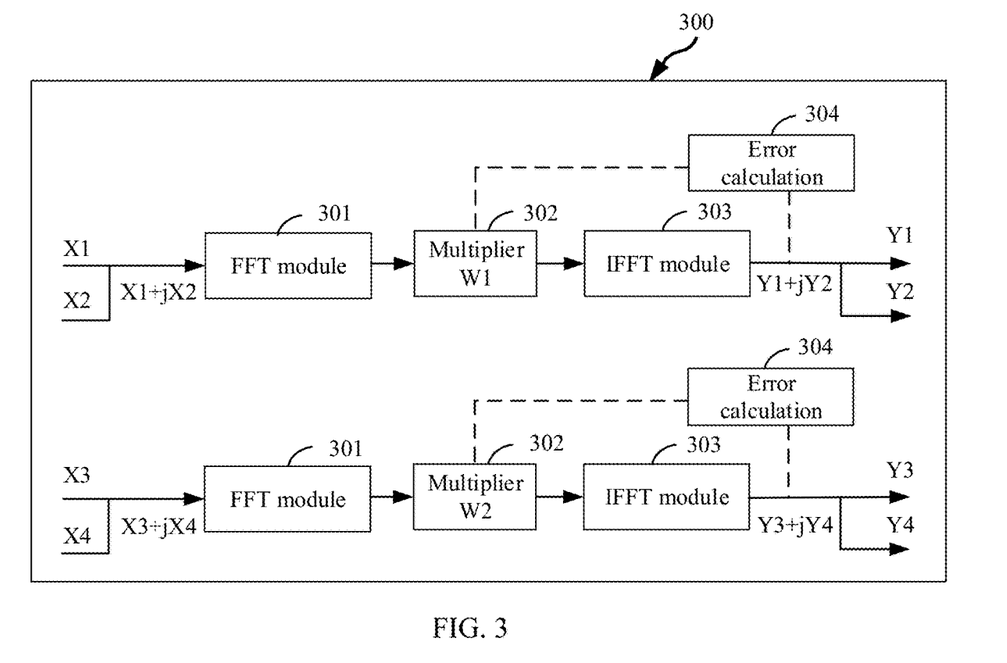
FIG. 3 is a schematic diagram of a logical structure of an equalizer according to an embodiment of the present invention.

FIG. 3 is a schematic diagram of a logical structure of an equalizer according to an embodiment of the present invention. The equalizer in FIG. 3 may be applied to the network scenario in FIG. 2, that is, the equalizer 206 in FIG. 2. In the optical transmission system in FIG. 2, the four channels of the digital electrical signals: X1, X2, X3, and X4 are obtained after the ADC at the receive end. The four channels of the digital electrical signals may be mutually independent sequences. A plurality of channels of mutually independent digital electrical signals may be understood as follows: Optical signals used to carry the plurality of channels of the digital electrical signals have a random polarization state or a random phase. As shown in FIG. 3, an equalizer 300 combines any two channels of digital electrical signals into one channel of a complex signal, and then performs frequency domain equalization processing. Therefore, the equalizer 300 includes two FDEQs. Each FDEQ may include a Fourier transform (FFT) module (or referred to as a time-to-frequency conversion module) 301, a multiplier W1/W2 302, and an inverse Fourier transform (IFFT) module (or referred to as a frequency-to-time conversion module) 303; and may further include an error calculation module 304.

The FFT module 301 combines two channels of input digital electrical signals into one channel of a complex signal. The two channels of the input digital electrical signals are real signals. One channel of a digital signal may be used as a real part of the complex signal, and the other channel of a digital signal may be used as an imaginary part of the complex signal. For example, two channels of real signals: X1 and X2 are combined into one channel of a complex signal X1+jX2, and two channels of real signals: X3 and X4 are combined into X3+jX4. If a sequence of the signal X1/X3 is {a0, a1, a2, . . . , an}, and a sequence of the signal X2/X4 is {b0, b1, b2, . . . , bn}, X1 and X2 are combined into one channel of a complex signal X1+jX2, and X3 and X4 are combined into one channel of a complex signal X3+jX4. A sequence of X1+jX2 or X3+jX4 is {a0+b0j, a1+b1j, a2+b2j, . . . , an+bnj}. Specifically, the two channels of the received real signals may be placed in the same cache queue. It is considered that the two channels of the real signals are combined into one channel of a complex signal. The combined complex signal is a time domain signal. The FFT module 301 converts the complex signal in time domain into the complex signal in frequency domain. For example, the sequence {a0+b0j, a1+b1j, a2+b2j, . . . , an+bnj} of the complex signal X1+jX2 or X3+jX4 is converted to {A0+B0j, A1+B1j, A2+B2j, . . . , An+Bnj} after FFT. In other words, the complex signal in time domain is changed to the complex signal in frequency domain after the FFT. Herein, X1 and X3 may be different sequences, X2 and X4 may be different sequences, and X1+jX2 and X3+jX4 may be different sequences. For ease of description, the same sequence symbol is used for description.

The multiplier W1 302 has a tap coefficient W1. Herein, W1 may be a complex vector. Herein, W1 is multiplied by a frequency domain complex signal corresponding to X1+jX2. The multiplier W2 302 has a tap coefficient W2. Herein, W2 may be a complex vector. Herein, W2 is multiplied by a frequency domain complex signal corresponding to X3+jX4. The tap coefficient of the multiplier W1/W2 302 has an initial value. For example, the initial value is set to 1. After the multiplier W1/W2 302 obtains an error value from the error calculation module 304, the tap coefficient may be adjusted. The tap coefficient is used to multiply the frequency domain complex signal output by the FFT module 301 to implement signal correction or compensation for the complex signal output by the FFT module 301 in frequency domain. For example, compensation may be implemented for ISI caused due to damage such as a narrow band, dispersion, or non-ideal clock sampling.

Figure 4:
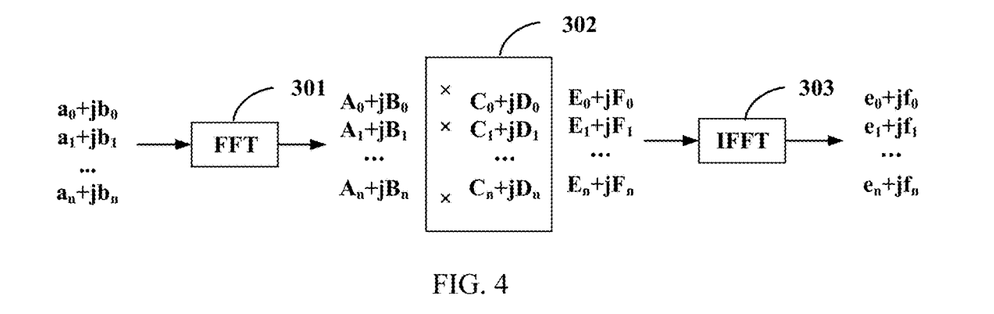
FIG. 4 is a schematic diagram of signal processing of an equalizer according to an embodiment of the present invention.

FIG. 4 is a schematic diagram of signal processing of an equalizer according to an embodiment of the present invention. As shown in FIG. 4, the sequence {a0+b0j, a1+b1j, a2+b2j, . . . , an+bnj} of the complex signal X1+jX2 or X3+jX4 is converted to a sequence of a complex signal {A0+B0j, A1+B1j, A2+B2j, . . . , An+Bnj} in frequency domain after the FFT. A sequence of the tap coefficient W1/W2 may be {C0+D0j, C1+D1j, C2+D2j, . . . , Cn+Dnj}. The sequence of the tap coefficient W1/W2 is multiplied by a sequence output by the FFT module 301 to obtain a sequence {E0+F0j, E1+F1j, E2+F2j, . . . , En+Fnj}. For example, A0+B0j is multiplied by C0+D0j to obtain A0*C0+A0*D0j+B0*C0j−B0*D0, that is, E0+F0j; A1+B1j is multiplied by C1+D1j to obtain A1*C1+A1*D1j+B1*C1j−B1*D1, that is, E1+F1j; . . . ; and An+Bnj is multiplied by Cn+Dnj to obtain An*Cn+An*Dnj+Bn*Cnj−Bn*Dn, that is, En+Fnj. The tap coefficients: W1 and W2 may be different sequences. For ease of description, the same sequence symbol is used for description.

The IFFT module 303 converts a frequency domain signal {E0+F0j, E1+F1j, E2+F2j, . . . , En+Fnj} output by the multiplier W1 302 into a time domain signal Y1+jY2; or converts a frequency domain signal {E0+F0j, E1+F1j, E2+F2j, . . . , En+Fnj} output by the multiplier W2 302 into a time domain signal Y3+Y4j. A sequence of the time domain signal Y1+jY2 or Y3+Y4j includes {e0+jf0, e1 +jf1, e2+jf2, . . . , en+jfn}. Then, for the time domain signals Y1+jY2 and Y3+Y4j, a real part is separated from an imaginary part to obtain four channels of output signals: Y1, Y2, Y3, and Y4. Herein, Y1+jY2 and Y3+Y4j may be different sequences. For ease of description, the same sequence symbol is used for description.

The error calculation module 304 may perform error calculation based on the time domain signal Y1+jY2 or Y3+Y4j output by the IFFT module 303, or may perform error calculation based on the time domain signals Y1 and Y2, or Y3 and Y4 that are obtained after the real part is separated from the imaginary part. The error calculation module 304 feeds back the calculated error value to the multiplier W1/W2 302 for tap coefficient adjustment. If the calculated error value is a frequency domain signal, the error calculation module 304 may directly feed back the calculated error value to the multiplier W1/W2 302 for tap coefficient adjustment. If the calculated error value is a time domain signal, the error calculation module 304 may convert the error value to a frequency domain signal, and feed back the frequency domain signal to the multiplier W1/W2 302 for tap coefficient adjustment. The error calculation module 304 may periodically adjust a tap coefficient for the multiplier W1/W2, or adjust a tap coefficient when the error value calculated by the error calculation module 304 is greater than a threshold.

The error value error calculated by the error calculation module 304 may be indicated by using the following formula: error=err_i+j·err_q. Herein, err_i and err_q are respectively the errors of the two channels of the real signals: Y1 and Y2 in Y1+jY2; or the errors of the two channels of the real signals: Y3 and Y4 in Y3+Y4j. The error value error indicates an error between an actual signal and an ideal signal. The error calculation module 304 may use a blind calculation manner, or a sequence training manner. For example, error calculation of Y1+jY2 is used as an example for description.

A CMA algorithm is used: err_i=(|Y1|^2−R1)·Y1 and err_q=(|Y2|^2−R2)·Y2, where R1 and R2 are respectively average modulus values of channels of signals: Y1 and Y2.

An MMA algorithm is used: err_i=(|Y1|^2−R1m)·Y1 and err_q=(|Y2|^2−R2m)·Y2, where R1m and R2m are respectively modulus values corresponding to channels of signals: Y1 and Y2.

An LMS algorithm is used: err_i=Y1−De(Y1) and err_q=Y2−De(Y2), where De(Y1) and De(Y2) are respectively decision values or corresponding training sequence values of channels of signals: Y1 and Y2.

After the multiplier W1/W2 302 receives the error value error generated by the error calculation module 304, the tap coefficient may be adjusted according to the following formula:

$$W'=W-\mathrm{mu}*\mathrm{error}*\mathrm{conj}(X\mathrm{in})$$

Herein, W' may be the tap coefficient W1 or W2 after the adjustment, W may be the tap coefficient W1 or W2 before the adjustment, mu is an adjustment step that can be set as required, Xin is a signal input to the multiplier W1/W2, and conj (Xin) is a conjugate operation performed on Xin. Herein, Xin is a cached input signal, and is a signal corresponding to the same moment of the time domain signal Y1+jY2 or Y3+Y4j used during calculation of the error value error. For example, if Xin is A0+jB0, the time domain signal e0+jf0 is used to calculate the error value error.

The tap coefficient of the multiplier W1 may be adjusted based on the time domain signal Y1+jY2 processed by the multiplier W1, which is irrelevant to the other channel of the time domain signal Y3+Y4j. Likewise, the tap coefficient of the multiplier W2 may be adjusted based on the time domain signal Y3+Y4j processed by the multiplier W2, which is irrelevant to the other channel of the time domain signal Y1+jY2. A better frequency domain equalization effect can be obtained through dynamic adjustment of the tap coefficient, to effectively compensate for signal quality deterioration caused due to ISI.

In the technical solutions of this embodiment of the present invention, any two channels of digital electrical signals (real signals) may be combined into one channel of a complex signal. In other words, every two channels of signals correspond to one FDEQ, and a quantity of required FDEQs is half of that of TDEQs, to reduce power consumption and occupied resources caused due to an excessively large quantity of taps in the TDEQ and reduce system complexity.

The equalizer in this embodiment of the present invention may be applied to any communication system of a plurality of channels of transmitted signals. In other words, the communication system may include at least two channels of transmitted signals. A quantity of channels of signals may be an even number, or may be an odd number. When the quantity of channels of transmitted signals is N, and N is an even number, the equalizer may include N/2 FDEQs. When the quantity of channels of transmitted signals is N, and N is an odd number, the equalizer may include (N−1)/2 FDEQs.

The equalizer shown in FIG. 3 is an example of even-numbered (four) channels of transmitted signals. If each two of the even-numbered channels of signals are combined into one channel of a signal, the equalizer includes two FDEQs. When the equalizer is applied to the communication system of two channels of transmitted signals, the equalizer includes one FDEQ in FIG. 3. Another case of even-numbered channels is similar to this case. Details are not described herein.

Figure 5:
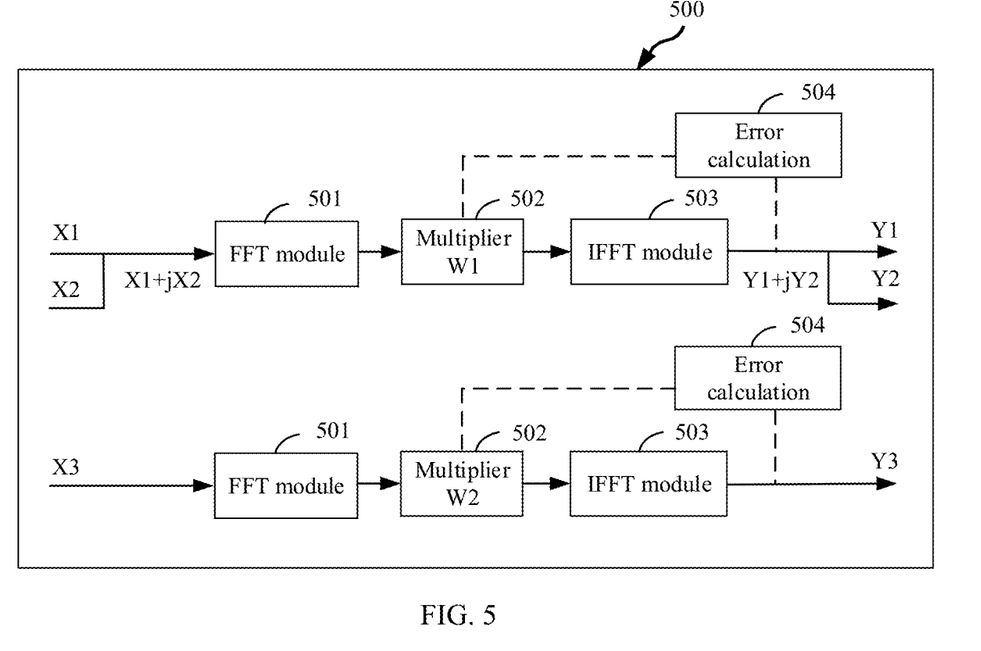
FIG. 5 is a schematic diagram of a logical structure of an equalizer according to an embodiment of the present invention.

FIG. 5 is a schematic diagram of a logical structure of an equalizer according to an embodiment of the present invention. The equalizer shown in FIG. 5 is an example of odd-numbered channels of transmitted signals. Any two channels of signals: X1 and X2 may be combined into one channel of a signal for frequency domain equalization processing such as FFT, tap coefficient multiplication, and IFFT shown in FIG. 3. Time domain equalization processing or frequency domain equalization processing is performed on one left channel of a signal X3. For frequency domain equalization of X1 and X2, refer to the descriptions in the embodiment corresponding to FIG. 3. For X3, time domain equalization may be implemented by using the TDEQ shown in FIG. 1. If the frequency domain equalization is implemented for X3, a real sequence of X3 is directly input to an FFT module 501, multiplied by a tap coefficient of a multiplier W2 502 in frequency domain, and converted into a time domain signal through an IFFT module 503. The time domain signal is directly output. In other words, frequency domain equalization is directly performed on a single channel of a signal without combination and division.

Figure 6:
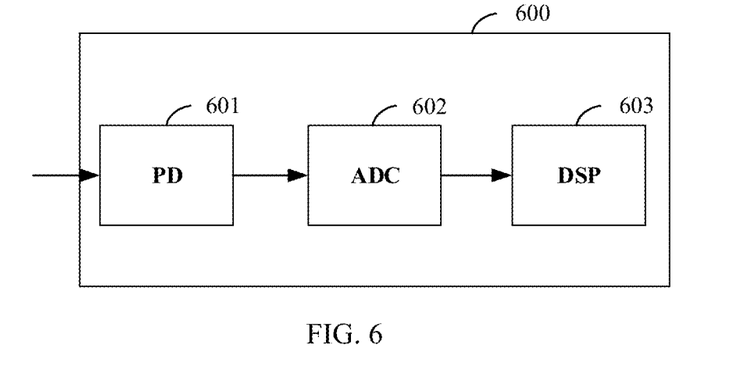
FIG. 6 is a schematic diagram of a logical structure of an optical receiver according to an embodiment of the present invention.

FIG. 6 is a schematic diagram of a logical structure of an optical receiver according to an embodiment of the present invention. As shown in FIG. 6, the optical receiver 600 includes a PD 601, an ADC 602, and a digital signal processor (DSP) 603. Similar to the PD 204, the PD 601 converts a received optical signal into an electrical signal. Similar to the ADC 205, the ADC 602 converts an analog electrical signal into a digital electrical signal. An amplifier (not shown in the figure) may be further included between the PD 601 and the ADC 602. The amplifier is an electrical amplifier, and may be implemented by using a trans-impedance amplifier (TIA) and an automatic gain control (AGC). The amplifier is configured to adjust a level of an electrical signal output by the PD 601 to a work range of the ADC 602. The DSP 603 may include an equalizer, for example, the equalizer 206 in FIG. 2, the equalizer 300 in FIG. 3, and the equalizer 500 in FIG. 5. The equalizer is configured to: receive the digital electrical signal from the ADC 602, and perform equalization processing on the digital electrical signal. In addition, the DSP 603 may further include functions such as clock recovery and sequence detection. In addition being implemented based on a DSP, the equalizer may be further implemented based on an application-specific integrated circuit (ASIC), a field programmable gate array (FPGA), or the like. For specific functions of the equalizer, refer to the foregoing embodiments. Details are not described herein again.

In this embodiment of the present invention, when a TDEQ needs a large quantity of taps, complexity of performing equalization processing by using an FDEQ is lower than that of the TDEQ. Four channels of 200G signal transmission are used as an example. Time domain equalization requires four independent TDEQs to perform a time domain convolution operation. A frequency domain equalizer requires two FDEQs to perform a frequency domain multiplication operation. The complexity of the TDEQ may be compared with that of the FDEQ based on quantities of required summators or multipliers.

A quantity of multipliers of four TDEQs is N*L*4.

A quantity of multipliers of two FDEQs is 2(N+Olp)*log 2(N+Olp)*2+2N*log 2(N)*2+(N)*4*2.

A quantity of summators of four TDEQs is N×(L−1)×4.

A quantity of summators of two FDEQs is 2(N+Olp)×log 2(N+Olp)×2+2N×log 2(N)×2+(N+Olp)×2×2.

Herein, N is a data block length, L is an optimal quantity of taps in a TDEQ, and Olp is an overlap length of FFT in an FDEQ. During complexity calculation, the quantity of taps in the TDEQ is equivalent to the overlap length in the FDEQ.

Figure 7:
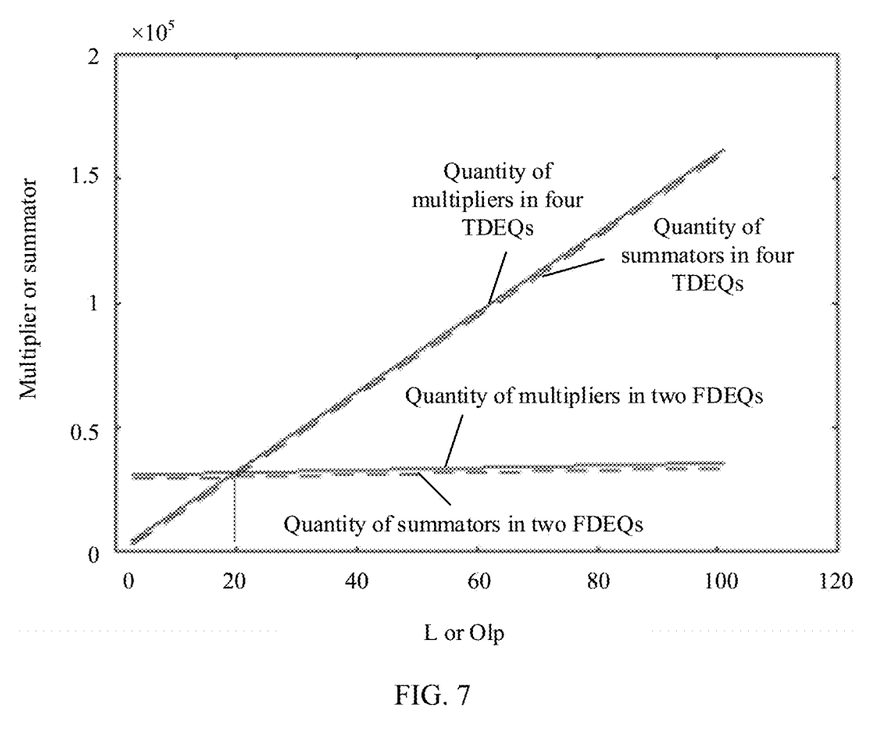
FIG. 7 is a schematic diagram of complexity analysis of a frequency domain equalizer according to an embodiment of the present invention.

FIG. 7 is a schematic diagram of complexity analysis of an FDEQ according to an embodiment of the present invention. As shown in FIG. 7, it is assumed that N=400 and Olp=L. In the figure, a solid line with a larger slope represents a relationship between a quantity of multipliers required for four TDEQs and L or overlap, and a dashed line with a larger slope represents a relationship between a quantity of summators required for four TDEQs and L or overlap. In the figure, a solid line with a smaller slope represents a relationship between a quantity of multipliers required for two FDEQs and L or overlap, and a dashed line with a smaller slope represents a relationship between a quantity of summators required for two FDEQs and L or overlap. It may be learned that when the quantity L of taps or overlap is greater than or equal to 20, complexity of the two FDEQs is lower than complexity of the four TDEQs. Because a bandwidth of a component is severely limited in an 800G system, a quantity of taps required for the TDEQ is far greater than 20.

Figure 8:
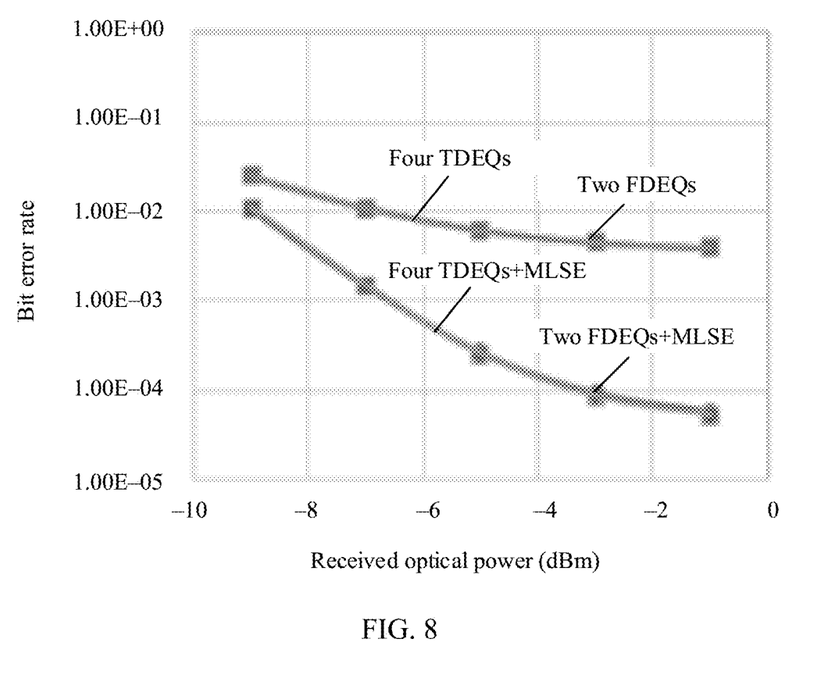
FIG. 8 is a schematic diagram of performance analysis of a frequency domain equalizer according to an embodiment of the present invention.

FIG. 8 is a schematic diagram of performance analysis of an FDEQ according to an embodiment of the present invention. For example, in FIG. 8, four channels of 112 GB-PAM4 signals are simulated. An equalization effect of four channels of independent TDEQs is compared with an equalization effect of two channels of FDEQs. As shown in FIG. 8, two curves are change curves of a bit error rate (BER) of four TDEQs and a bit error rate of two FDEQs that change with received optical power (ROP) without maximum likelihood sequence estimation (MLSE). The two curves approximately coincide. The other two curves are change curves of a BER of four TDEQs and a BER of two FDEQs that change with ROP with MLSE. The two curves approximately coincide. It may be learned that performance achieved by the FDEQ is approximately the same as performance achieved by the TDEQ, but system complexity of the FDEQ is much lower than that of the TDEQ.

All or some of the foregoing embodiments may be implemented by using software, hardware, firmware, or any combination thereof. When the software is used to implement the embodiments, all or some of the embodiments may be implemented in a form of a program product. The program product includes one or more instructions. When the program instructions are loaded and executed on an optical transceiver, the procedures or functions according to the embodiments of the present invention are all or partially generated. The optical receiver may be an optical module. The optical receiver may have an optical receiving function, or may have both an optical sending function and the optical receiving function. The instructions may be stored in a readable storage medium or transmitted from a readable storage medium of one device to a readable storage medium of another device. The readable storage medium may be any usable medium accessible by the optical transceiver, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A frequency domain equalization method, wherein the method comprises:
   receiving at least two channels of digital electrical signals;
   randomly selecting two channels of mutually independent digital electrical signals from the at least two channels of the digital electrical signals;
   obtaining a first complex signal, wherein the first complex signal is a first time domain signal, and the first complex signal is obtained based on the two channels of mutually independent digital electrical signals;
   converting the first complex signal into a frequency domain signal;
   multiplying the first complex signal in frequency domain by a tap coefficient to obtain a second complex signal, wherein the tap coefficient is used to implement signal compensation for the first complex signal in frequency domain;
   converting the second complex signal into a second time domain signal;
   dividing the second time domain signal into two channels of real signals; and
   outputting the two channels of real signals.

2. The method according to claim 1, wherein the first complex signal comprises a real part and an imaginary part, the real part comes from one of the two channels of the mutually independent digital electrical signals, and the imaginary part comes from the other one of the two channels of the mutually independent digital electrical signals.

3. The method according to claim 1, wherein the method further comprises:
   obtaining an error value based on at least one of the second time domain signal or the two channels of the real signals, wherein the error value is used to adjust the tap coefficient.

4. The method according to claim 3, wherein the method comprises:
   adjusting the tap coefficient based on the error value and the first complex signal in frequency domain.

5. The method according to claim 1, wherein any two channels of mutually independent digital electrical signals are obtained from two channels of optical signals having a random polarization state or a random phase.

6. An equalizer, configured to:
receive at least two channels of digital electrical signals; and
randomly select two channels of mutually independent digital electrical signals from the at least two channels of the digital electrical signals, wherein the equalizer comprises:
a time-to-frequency convertor, configured to:
obtain a first complex signal; and
convert the first complex signal to a frequency domain signal, wherein the first complex signal is a first time domain signal, and the first complex signal is obtained based on the two channels of mutually independent digital electrical signals;
a multiplier, configured to multiply the first complex signal in frequency domain by a tap coefficient to obtain a second complex signal, wherein the tap coefficient is used to implement signal compensation for the first complex signal in frequency domain; and
a frequency-to-time convertor, configured to:
convert the second complex signal into a second time domain signal;
divide the second time domain signal into two channels of real signals; and
output the two channels of the real signals.

7. The equalizer according to claim 6, wherein the first complex signal comprises a real part and an imaginary part, the real part comes from one of the two channels of the mutually independent digital electrical signals, and the imaginary part comes from the other one of the two channels of the mutually independent digital electrical signals.

8. The equalizer according to claim 6, wherein the equalizer further comprises:
an error calculator, configured to obtain an error value based on at least one of the second time domain signal or the two channels of the real signals, wherein the error value is used to adjust the tap coefficient.

9. The equalizer according to claim 8, wherein the multiplier is configured to:
adjust the tap coefficient based on the error value and the first complex signal in frequency domain.

10. The equalizer according to claim 6, wherein any two channels of mutually independent digital electrical signals have a random polarization state or a random phase.

11. An optical receiver, wherein the optical receiver comprises a photoelectric detector, an analog-to-digital converter, and a digital signal processor, wherein:
the photoelectric detector is configured to:
receive an optical signal; and
convert the optical signal into an analog electrical signal;
the analog-to-digital converter is configured to convert the analog electrical signal into a digital electrical signal, wherein the digital electrical signal comprises two channels of mutually independent digital electrical signals; and
the digital signal processor is configured to:
receive at least two channels of digital electrical signals;
randomly select the two channels of the mutually independent digital electrical signals from the at least two channels of the digital electrical signals;
obtain a first complex signal, wherein the first complex signal is a first time domain signal, and the first complex signal is obtained based on two channels of mutually independent digital electrical signals;
convert the first complex signal into a frequency domain signal;
multiply the first complex signal in frequency domain by a tap coefficient to obtain a second complex signal, wherein the tap coefficient is used to implement signal compensation for the first complex signal in frequency domain;
convert the second complex signal into a second time domain signal;
divide the second time domain signal into two channels of real signals; and
output the two channels of real signals.

12. The optical receiver according to claim 11, wherein the first complex signal comprises a real part and an imaginary part, the real part comes from one of the two channels of the mutually independent digital electrical signals, and the imaginary part comes from the other one of the two channels of the mutually independent digital electrical signals.

13. The optical receiver according to claim 11, wherein the digital signal processor is configured to:
obtain an error value based on at least one of the second time domain signal or the two channels of the real signals, wherein the error value is used to adjust the tap coefficient.

14. The optical receiver according to claim 13, wherein the digital signal processor is configured to:
adjust the tap coefficient based on the error value and the first complex signal in frequency domain.

15. The optical receiver according to claim 11, wherein any two channels of mutually independent digital electrical signals are obtained from two channels of optical signals having a random polarization state or a random phase.

* * * * *